United States Patent [19]
Behr et al.

[11] Patent Number: 4,933,515
[45] Date of Patent: Jun. 12, 1990

[54] ACCELEROMETER WITH DUAL-MAGNET SENSING MASS

[75] Inventors: Leonard W. Behr, Pontiac; Donald A. Duda, Novi, both of Mich.

[73] Assignee: Automotive Systems Laboratory, Inc., Farmington Hills, Mich.

[21] Appl. No.: 321,369

[22] Filed: Mar. 9, 1989

[51] Int. Cl.$^5$ ............................................. H01H 35/14
[52] U.S. Cl. .......................... 200/61.45 M; 200/61.53; 335/306
[58] Field of Search ............... 335/208, 306, 217, 207; 200/61.45 M, 61.53

[56] References Cited

U.S. PATENT DOCUMENTS 3,061,754 10/1962 Kajihara ........................ 335/217 X
4,827,091 5/1989 Behr ............................ 200/61.53 X
4,873,401 10/1989 Ireland ........................ 200/61.45 M Primary Examiner—J. R. Scott
Attorney, Agent, or Firm—Lyman R. Lyon

[57] ABSTRACT

An acceleration sensor comprises a tube formed of an electrically-conductive non-magnetic material; a magnetically-permeable element, such as a iron washer, proximate with the passage; and a sensing mass in the passage comprising a pair of permanent magnets and a spacer whose magnetic permeability increases with increasing temperature, with the magnets being secured to the opposite sides of the spacer so as to place a pair of like magnetic poles in opposition. In operation, the sensing mass interacts with the iron washer so as to be magnetically biased to a first position in the passage, while the magnetic-permeability of the spacer and, hence, the magnetic flux generated by the sensing mass adjusts to maintain a nearly constant threshold magnetic bias irrespective of variations in sensor temperature. The sensing mass is displaced in response to acceleration of the housing from its first position in the passage towards a second position therein when such acceleration overcomes the threshold magnetic bias, while the tube itself interacts with the sensing mass to provide magnetic damping therefor. Upon reaching the second position in the tube, the sensing mass electrically bridges a pair of contacts to indicate that a threshold level of acceleration has been achieved. An electrical coil is secured proximate with the iron washer which, when energized, reversibly magnetizes the latter, whereby the sensing mass is either repelled to the second position in the tube or more strongly biased towards the first position therein.

22 Claims, 1 Drawing Sheet

U.S. Patent
Jun. 12, 1990
4,933,515
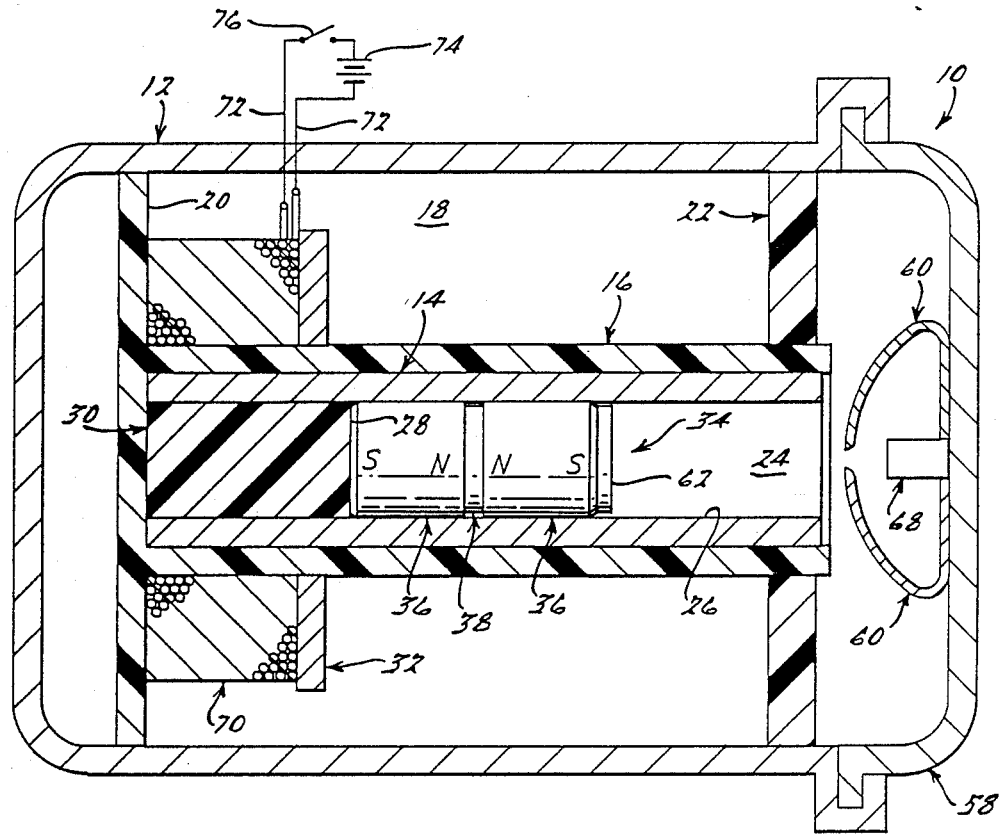
FIG. 1.
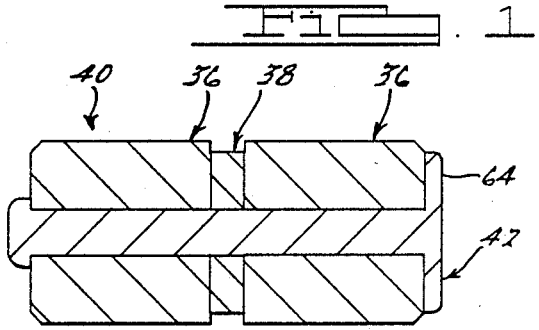
FIG. 2.
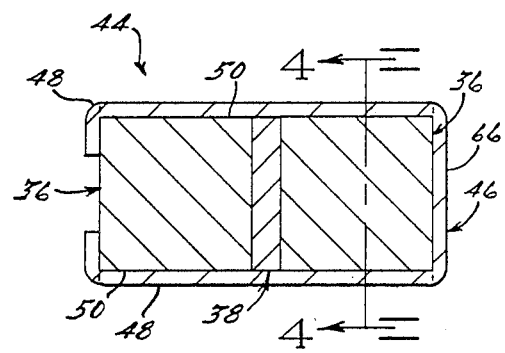
FIG. 3.
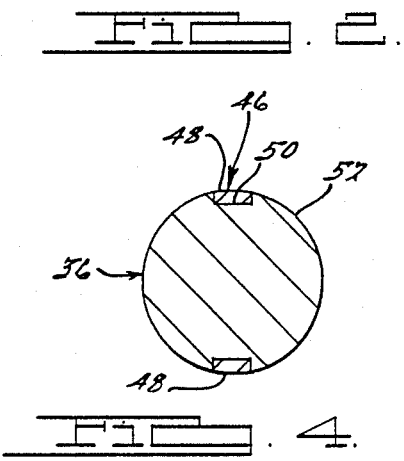
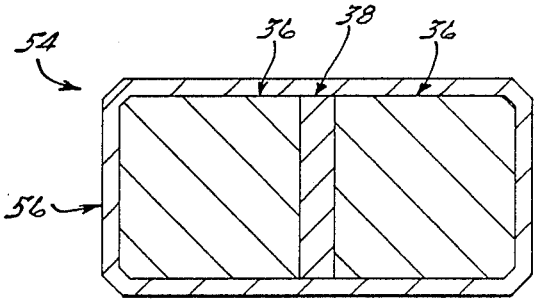
FIG. 4.
FIG. 5.

ACCELEROMETER WITH DUAL-MAGNET SENSING MASS

BACKGROUND OF THE INVENTION

The instant invention relates to means for sensing the acceleration profile of an object, such as a motor vehicle.

The prior art teaches magnetically-biased acceleration sensors, or accelerometers, comprising a housing having an inertial or sensing mass within a cylindrical passage therein which is magnetically biased towards a first end of the passage. Such magnetic biasing of the sensing mass offers the advantage of providing a maximum biasing force on the sensing mass when the sensing mass is in its initial position proximate the first end of the passage. When the housing is subjected to an accelerating force which exceeds this threshold magnetic bias, the sensing mass moves along the passage away from the first end thereof toward a second position at the other end thereof, with such movement being retarded by suitable damping means therefor. Where the acceleration input is of sufficient magnitude and duration to displace the sensing mass to the second position within the passage, the sensing mass triggers switch means in the sensor, as by bridging a pair of electrical contacts therein, whereupon an instrumentality connected with the switch means, such as a vehicle passenger restraint system, is actuated. In this manner, the sensor mechanically integrates the acceleration input to the housing.

An example of a magnetically-biased accelerometer is taught in U.S. Pat. No. 4,329,549, issued May 11, 1982 to Breed, wherein a magnet secured to the housing proximate the first end of the tubular passage exerts a magnetic biasing force on a magnetically-permeable ball, with the movement of the ball being damped by a gas contained within the tube. However, as the ball moves along the tube from its initial position at the first end thereof towards the contacts at the other end, the gas damping force quickly predominates in retarding the ball's movement. Thus, in the event of a loss of the damping effect due to the failure of the seal which operates to maintain the gas within the tube, any acceleration exceeding the initial magnetic biasing threshold will cause the ball to be fully displaced to the other end of the tube, thereby triggering the switch means of the sensor. In other words, an accelerometer constructed in accordance with Breed is not able to properly mechanically integrate acceleration inputs thereto in the absence of the gas damping. It is also significant that the use of gas damping requires extreme tolerance control of the gap between the walls of the tube and the ball, thereby increasing manufacturing costs.

Additionally, the ball-in-tube configuration taught by Breed may not properly integrate an acceleration input, the direction of which is not wholly coincident with the longitudinal axis of the tube: as the threshold magnetic bias is exceeded, the ball will begin to roll as it translates the length of the tube. The presence of any cross-axis vibration or transient acceleration may cause contact between the ball and other parts of the tube's inner surface such as the "roof" thereof, whereupon the ball's rotational momentum will try to direct the ball back towards the first end of the tube, even when the longitudinal component of the acceleration input is still urging the ball towards the contacts.

Still further, the magnetic bias and the gas damping featured in the Breed sensor are susceptible to unacceptable variation over temperature. Specifically, the magnetic flux generated by the fixed magnet is affected by changing temperature so as to produce significant variation in the threshold magnetic bias on the ball thereof. And, the disparate coefficients of thermal expansion of the ball and tube, as well as the changing compressibility of the damping gas over temperature, combine to adversely affect the damping characteristics of sensors constructed in accordance with the Breed patent.

Co-pending application Ser. No. 07/248,143, filed Sept. 23, 1988, now U.S. Pat. No. 4,827,091, teaches an accelerometer having a magnetic sensing mass which is magnetically biased against a magnetically-permeable element secured proximate with an end of a passage within a housing. When the housing is subjected to an acceleration sufficient to overcome the magnetic biasing force, the sensing mass is displaced towards the contacts at the other end of the passage, such displacement being damped by the magnetic interaction of the sensing mass with a plurality of electrically-conductive non-magnetic rings encompassing the passage. The contacts at the other end of the passage move longitudinally of the passage in response to temperature in order to compensate for the effects of temperature on the magnetic damping employed therein. The accelerometer further comprises a plurality of electrical coils encompassing the passage which, when energized by the delivery of direct current therethrough, effects the displacement of the sensing mass to the second position in the passage, against the contacts, whereby the operability of the sensor may be readily confirmed. Alternatively, the current is delivered through the coils in the reverse direction, whereby the magnetic biasing force is controllably increased.

Unfortunately, the accelerometer taught in U.S. Pat. No. 4,827,091, like the Breed sensor discussed hereinabove, is unable to compensate for the effects of temperature on the magnetic flux generated by the sensing mass and, hence, the sensor's threshold magnetic bias and magnetic damping force. Thus, as the magnetic flux generated by the sensing mass reversibly decreases with increasing temperature, both the threshold magnetic bias and the magnetic damping generated upon displacement of the sensing mass are correspondingly decreased, with the attendant risk that the instrumentality controlled by the sensor will be triggered by a relatively low acceleration input.

Finally, it is noted that accelerometers are frequently deployed in pairs in the interest of increased reliability, e.g., a sensor having a relatively low acceleration threshold serves to "arm" a second sensor having a relatively high acceleration threshold tailored to the particular application involved. However, in the event that the high-threshold sensor fails in the "closed" condition, i.e., incorrectly indicates an acceleration condition necessitating the deployment of the instrumentality controlled thereby, any acceleration exceeding the low acceleration threshold of the "arming" sensor will cause the deployment of that instrumentality. A graphic illustration of this condition is the deployment of an air bag upon encountering a pothole subsequent to the failure of the high-threshold sensor. It is therefore highly desirable to be able to spontaneously increase the biasing force on the sensing mass of the arming sensor and, hence, its acceleration threshold, upon an indication that the high-threshold sensor has "failed closed."

SUMMARY OF THE INVENTION

It is the object of the instant invention to provide an accelerometer which automatically compensates for the effects of temperature on both the magnetic biasing force and the magnetic damping force employed thereby.

A further object of the instant invention is to provide an accelerometer having means incorporated therein for testing its operability.

Yet another object of the instant invention is to provide a magnetically-biased accelerometer, the threshold biasing force of which may be readily increased upon the delivery of a direct current thereto.

The accelerometer of the instant invention comprises a housing having a passage extending therein; a magnetically-permeable element, such as an iron or steel washer, secured to the housing proximate with the passage; and a magnetic sensing mass within the passage comprising a pair of cylindrical longitudinally-polarized permanent magnets and a magnetically-permeable spacer, the magnets being secured to opposite sides of the spacer so as to place a pair of like magnetic poles thereof in opposition.

In a preferred embodiment, the magnetic permeability of the spacer increases with increasing temperature to compensate for the effects of temperature on the magnetic flux generated by the individual magnets comprising the sensing mass, whereby a nearly constant magnetic flux is generated by the sensing mass irrespective of sensor temperature. The thickness of the spacer is chosen so as to prevent the saturation thereof while maximizing the magnetic flux generated by the sensing mass.

Alternatively, the sensing mass includes means for increasingly shunting the magnets of the sensing mass with decreasing temperature. Thus, as the temperature increases and the magnets begin to generate less magnetic flux, the shunt diverts less of the magnetic flux that is in fact generated by the magnets, resulting once again in the generation of a nearly constant level of magnetic flux by the sensing mass as a whole.

In operation, the sensing mass is magnetically biased towards the washer so as to remain in a first position within the passage proximate with the washer until the magnetic bias is overcome by acceleration of the housing, whereupon the sensing mass is displaced in response to such acceleration towards a second position within the passage. The magnetic bias is sufficient to return the sensing means to the initial position within the passage from any other position therein short of the second position upon a reduction in the acceleration input to the housing.

Upon reaching the second position, the sensing mass operates a switch to indicate that a threshold level of acceleration has been achieved. For example, in a preferred embodiment of the instant accelerometer, the switch comprises a pair of electrical contacts which project into the passage for engagement with an electrically-conductive surface of the sensing mass upon displacement of the sensing mass to the second position within the passage. The electrically-conductive surface of the sensing mass may in turn comprise a portion of a metallic fastener which mechanically secures the magnets to the spacer.

The instant accelerometer further comprises magnetic damping means for retarding the displacement of the sensing mass within the passage. In the preferred embodiment, the magnetic damping means comprises an electrically-conductive non-magnetic tube which encompasses the passage and magnetically interacts with the sensing mass upon the displacement thereof. In this regard, the tube may encircle a portion of the element defining the passage or, alternatively, may itself define a portion of the passage with the inner surface thereof. The displacement of the sensing mass within the passage induces a plurality of longitudinally-discrete electric currents in the tube which flow substantially circumferentially therein and which vary with the rate of such sensing mass displacement relative thereto and the distance of the sensing mass therefrom. The electric current induced in each affected longitudinal portion of the tube in turn generates a magnetic field which interacts with the sensing mass to retard the displacement thereof.

The instant accelerometer also features switchable means for reversibly magnetizing the washer, whereby the sensing mass is either displaced to the second position within the passage without regard to acceleration of the housing, or the threshold magnetic bias thereon is increased to any desired value without adversely affecting the responsiveness of the sensor.

The instant magnetic sensing mass permits the optimization of the temperature-response characteristics of either the threshold magnetic bias or the magnetic damping force through definition of how the magnetic flux generated by the sensing mass varies with temperature. Alternatively, a compromise may be struck therebetween, as where the threshold magnetic bias remains substantially constant over the operating range of the sensor, with only a slight reduction in the magnetic damping in response to changes in sensor temperature. And, where the contacts comprising the switch are formed of a bimetallic material so as to permit the free ends thereof to move longitudinally of the passage in response to temperature, the "stroke" of the passage, i.e., the distance from the first position within the passage to the second position therein, is adjusted to compensate for remaining deleterious temperature effects on the magnetic damping force.

Specifically, in the event of an increase in the operating temperature of the sensor, the magnetic permeability of the spacer of the sensing mass increases to offset the decreasing magnetic flux generated by the individual magnets thereof, and the stroke of the passage increases to offset the heightened electrical resistance in the damping tube and, hence, the less effective magnetic damping force achievable at such temperatures. Similarly, in the event of a decrease in the operating temperature of the instant sensor, the magnetic permeability of the spacer of the sensing mass decreases to offset the increased magnetic flux generated by the individual magnets thereof, whereby the overall magnetic flux generated by the sensing mass remains substantially constant notwithstanding the decrease in temperature; and the reduced stroke of the passage compensates for the heightened electrical resistance in the damping tube and the attendant increase in the effectiveness of the magnetic damping employed by the instant sensor with decreasing temperatures. The net result is that a substantially similar acceleration input is required to displace the sensing mass of the instant sensor to the second position within the passage thereof irrespective of the operating temperature thereof.

BRIEF DESCRIPTION OF THE DRAWINGS

FIG. 1 is a longitudinal view in cross-section of a vehicle accelerometer constructed in accordance with the instant invention showing the magnetic sensing mass thereof in its first position within the passage against the stop and a battery switchably connected across the coil thereof;

FIG. 2 is a longitudinal view in cross-section of a second embodiment of the sensing mass of the accelerometer;

FIG. 3 is a longitudinal view in cross-section of a third embodiment of the sensing mass of the accelerometer;

FIG. 4 is a cross-sectional view of the third embodiment of the sensing mass along line 4—4 of FIG. 3; and FIG. 5 is a longitudinal view in cross-section of a fourth embodiment of the sensing mass of the accelerometer.

DETAILED DESCRIPTION OF THE PREFERRED EMBODIMENT OF THE INVENTION

A vehicle accelerometer 10 constructed in accordance with the instant invention is illustrated in FIG. 1. An iron or steel housing 12 houses a tube 14 formed of an electrically-conductive non-magnetic material such as copper which is supported with respect thereto as by an encapsulating sleeve 16. The sleeve 16 is preferably formed of an electrically-insulative material such as plastic, and the tube 14 is preferably secured therein as by press-fitting or through the use of an adhesive. Preferably, an annular space 18 is provided between the outer surface of the sleeve 16 and the housing 12 as through the use of a radial flange 20 on one end of the sleeve 16, for purposes to be described hereinbelow. A second radial spacer 22 supports the other end of the sleeve 16 relative to the housing 12, whereby additional support is provided therefor.

A right circular cylindrical passage 24 is thus defined within the housing 12 by the inner surface 26 of the copper tube 14. The first end 28 of the passage 24 is in turn defined by a stationary stop element 30, such as a plastic plug.

A magnetically-permeable element such as an iron or steel washer 32 is secured proximate with the first end 28 of the passage 24 as by press-fitting the washer 32 about the plastic sleeve 16. It is noted that, in the preferred embodiment, the washer 32 is placed in proximity with, but electrically isolated from, the copper tube 14 to prevent galvanic corrosion. More specifically, the washer 32 is positioned so that a magnetic sensing mass 34 situated within the passage 24 will magnetically interact therewith so as to maintain the sensing mass 34 in a first position within the passage 24 against the stop 30 in the absence of an acceleration input thereto. The precise configuration of the washer 32, i.e., the thickness, and the inner and outer diameters thereof, is adjusted so as to obtain the desired threshold magnetic bias when the sensing mass 34 is at the first position within the passage 24.

The sensing mass 34 itself comprises a pair of substantially cylindrical magnets 36 formed, for example, of a powdered material comprising neodymium, iron and boron and are magnetized so as to place the magnetic poles thereof at their longitudinal ends, respectively. The sensing mass 34 further comprises a spacer 38 formed of a magnetically-permeable material such as iron. Specifically, the magnets 36 are secured to opposite sides of the spacer 38, respectively, so as to place a pair of like magnetic poles thereof in opposition. For example, FIG. 1 shows the magnets 36 of the sensing mass 34 having opposed "north" poles, with the magnets being secured to the spacer 38 by means of a suitable adhesive.

The spacer 38 is necessary to convey magnetic lines of force from the interior faces of the "bucking" magnets 36 to the surrounding copper tube 14. Thus, the thickness of the spacer 38 is preferably chosen so as to prevent the magnetic saturation of the material thereof while maximizing the magnetic flux generated by the sensing mass 34. It is noted that an increase of forty percent has been observed in the magnetic field generated by the dual-magnet sensing mass 34 of the instant accelerometer over the prior art single-magnet sensing mass formed of the same magnetic material and having the same external dimensions.

The diameter of the spacer 38 is less than that of the magnets 36 so as to ensure that the spacer does not protrude beyond the envelope thereof, as such a protruding edge would likely result in deleterious contact between the spacer 38 and the copper tube 14, e.g., increased wear of the tube and decreased sensor responsiveness due to the increase in the frictional resistance to displacement of the sensing mass within the passage 24. The longitudinal ends of the sensing mass 34 are chamfered to facilitate sensor assembly and to further reduce deleterious contact between the sensing mass and the surface 26 of the passage.

In accordance with another feature of the instant invention, the spacer 38 may be formed of a material whose magnetic permeability increases with increasing temperature. Thus, as the operating temperature of the sensor increases, the increasing magnetic permeability of the spacer 38 tends to offset the accompanying decrease in the magnetic flux generated by each individual magnet 36 of the sensing mass 34. Similarly, with decreasing temperature, the increase in the magnetic flux generated by each magnet 36 increases is offset by the accompanying decreased magnetic permeability of the spacer 38. As a result, the magnetic flux generated by the sensing mass as a whole is rendered less variable with respect to temperature, whereby the magnitude of the threshold magnetic bias on the sensing mass is more narrowly constrained. Indeed, it is believed that a prudent choice of magnet and spacer materials will provide a sensing mass 34 which generates a substantially constant magnetic flux over the entire operating temperature range thereof, resulting in a nearly constant threshold magnetic bias thereon irrespective of sensor temperature.

Alternatively, the magnets 36 of the sensing mass 34 may be shunted by a second element formed of a material whose magnetic permeability decreases with increasing temperature. For example, FIG. 2 shows a second embodiment 40 of the instant sensing mass having a rivet-like fastener 42 extending longitudinally therethrough. The fastener 42 is formed of a variably magnetically-permeable material such as the 32% nickel-iron alloy sold by the Carpenter Technology Corporation of Reading, Pennsylvania, under the name "CARPENTER TEMPERATURE COMPENSATOR '32'". Thus, as temperature increases, the decrease in the magnetic flux generated by the magnets 36 is offset by the decreasing ability of the shunt to divert the magnetic flux therethrough, whereby the magnetic flux generated by the sensing mass 34 is again maintained at a substantially constant level. Moreover, the fastener 42 serves to mechanically secure the magnets 36 to the spacer 38, thereby providing greater structural reliability. It will be appreciated that a non-magnetic rivet-like fastener may be employed in combination with the variably magnetically-permeable spacer 38 described in connection with the first embodiment 34 of the instant sensing mass.

FIGS. 3 and 4 show a third embodiment 44 of the instant sensing mass employing an external fastener such as a clip 46 having a plurality of longitudinally extending legs 48 seated in a like number of complementary grooves 50 formed longitudinally in the external surface 52 of the magnets 36. The legs 48 of the clip 46 may be flush with the external surface of the magnets as shown in FIG. 4 or, alternatively, the legs 48 may extend radially beyond the surface of the magnets to form a plurality of longitudinally-extending "runners" providing reduced frictional engagement between the sensing mass 44 and the inner surface 26 of the copper tube 14. FIG. 5 shows a fourth embodiment 54 of the sensing mass wherein the magnets 36 are secured to the spacer 38 as by an enveloping structure such as a metalized layer 56 comprising, for example, nickel, the thickness of which has been exaggerated in FIG. 5 to facilitate the illustration thereof. As in the second embodiment 40 of the sensing mass shown in FIG. 2, the clip 46 and metalization 56 of the third and fourth embodiments 44 and 54, respectively, may be formed of a shunting material such as "CARPENTER TEMPERATURE COMPENSATOR '32'" to increasingly divert the magnets'-flux with decreasing temperatures. Again, the clip 46 and metalization 56 serve to mechanically further secure the magnets 36 to the spacer 38 and, hence, non-magnetic versions thereof may be employed with the variably magnetically-permeable spacer 38 described hereinabove.

Referring once more to FIG. 1, the second end of the passage 24 is defined by the cap 58 comprising the other end of the housing 12. A pair of electrical contacts 60 are mounted on the cap 58 so as to project across the open end of the copper tube 14. The contacts 60 preferably comprise bimetallic strips formed, for example, of copper and stainless steel, and are gold-plated for improved electrical contact and greater corrosion resistance. The contacts 60 are thus able to move longitudinally of the passage 24 in response to changes in the temperature thereof, whereby the response of the instant accelerometer is adjusted for temperature effects thereon, as discussed hereinbelow.

The housing 12 is preferably sealed upon attachment of the cap 58 thereto during final assembly as by interlocking peripheral flanges thereon, respectively, in order to prevent the infiltration thereinto of moisture and other contaminants which might adversely affect the operation of the instant accelerometer 10. However, it is significant that the hermetic integrity of the seal thus formed between the cap 58 and the housing 12 is not critical to the continued operation of the sensor.

In operation, the sensing mass 34 is magnetically biased towards the washer 32 so as to remain in the first position within the passage 24 against the stop 30 until the threshold magnetic bias therebetween is exceeded by an acceleration input to the housing 12, whereupon the sensing mass 34 is displaced in response to such acceleration towards a second position within the passage 24 proximate with the second end thereof. Specifically, the second position of the sensing mass 34 within the passage, 24 is the position therein which results in the engagement of an electrically-conductive surface 62 of the sensing mass with the contacts 60, whereby the contacts are electrically bridged by the sensing mass.

The electrically-conductive surface 62, of the sensing mass 34 may comprise a copper element secured thereto which is in turn gold-plated for improved electrical contact and greater corrosion resistance. Alternatively, where the sensing mass employs a fastener to mechanically secure together the magnets and spacer thereof, the electrically-conductive surface may comprise a portion of the fastener, such as the head 64 of the rivet-like fastener 42 shown in FIG. 2, or the bight portion 66 of the clip 46 shown in FIG. 3. A second stop 68 prevents the escape of the sensing mass 34 from the copper tube 14 and prevents deleterious over-flexing of the contacts 60 when the sensor is subjected to an extreme acceleration, or during a test of the sensor in the manner described hereinbelow.

The magnetic bias on the sensing mass 34, i.e., the magnetic attraction between the sensing mass and the washer 32, is sufficient to return the sensing mass to its first position against the stop 30 from any other position within the passage 24 short of the second position upon a reduction in the accelerating input to the housing 12. The inner surface 26 of the copper tube 14 or the radially-outermost portion of the sensing mass 34, such as the outer surface 52 of the magnets 36 thereof, is preferably teflon-coated to reduce the sliding friction therebetween.

As noted hereinabove, the contacts 60 move longitudinally of the passage 24 in response to temperature. Specifically, the contacts move to the right of their positions shown in FIG. 1 with increasing temperature. Conversely, upon experiencing a decrease in the operating temperature of the sensor, the contacts move to the left of their positions shown in FIG. 1. In this manner, the "stroke" of the passage 24, i.e., the distance that the sensing mass 34 must travel to be displaced from its first position within the passage 24 to the second position therein, is automatically adjusted so as to compensate for the effects of temperature on the electrical resistance of the copper tube 14, as described more fully below.

The copper tube 14 of the accelerometer 10 provides magnetic damping for the sensing mass 34 which varies in proportion to the rate of such displacement of the sensing mass. More specifically, the tube provides a magnetic field which opposes such displacement of the sensing mass through the inducement therein of an electric current by the magnetic field of the sensing mass. It is noted that the damping tube 14 may encompass another element (not shown) defining the passage 24 or may itself define the passage 24, as shown in FIG. 1.

It is also noted that the copper tube 14 may be replaced by a multiplicity of electrically-conductive longitudinally-spaced rings (not shown) which are electrically isolated from one another by insulative spacers (also not shown) so as to permit the inducement therein of direct currents of different amplitude, flowing in opposite directions, upon displacement of the sensing mass 34 relative thereto. In the preferred embodiment, however, the magnetic pole pitch of the sensing mass 34 is such that, as a practical matter, only a single encompassing tube may be employed. It is believed that the magnetic field of the sensing mass induces substantially circumferential flow of current in that portion of the tube affected thereby. As a result, the resulting counter-flowing electrical currents proximate the magnetic poles of the sensing mass do not flow longitudinally of the tube and, hence, do not cancel each other out.

Still further, the magnets 36 and the spacer 38 of the sensing mass 34 are permitted to make electrical contact with the copper tube 14—the electrical resistance of the magnets and of the spacer are considerably higher than the resistance of the tube and, therefor, the resultant magnetic damping force is not significantly affected by such contact.

Variations in the magnetic damping field which result from changes in the electrical resistance of the copper tube 14 and any remaining variation in the magnetic flux generated by the sensing mass 34 due to changes in the temperature thereof are accommodated through the adjustment of the stroke of the passage 24 as described hereinabove. The accelerometer 10 thus continues to accurately mechanically integrate the acceleration input to the housing 12 notwithstanding changes in the operating temperature thereof.

The electromagnetic damping generated by the interaction between the tube 14 and the sensing mass 34 obviates the need for extreme manufacturing tolerances with respect to the gap between the sensing mass and the inner surface 26 of the tube. For example, with the instant sensor, the gap may be on the order of about ten thousandths of an inch, in contrast with a gap of perhaps only twenty microns which is typically required in prior art gas-damped sensors. Moreover, since the magnetic damping employed by the instant accelerometer 10 is unaffected by a breach of the seal formed between the housing 12 and the cap 58, there is no inherent failure mode as in such prior art gas-damped sensors.

An electrically-conductive wire 70 is wound around a coil form comprising the outer surface of the plastic sleeve 16, the sleeve's radial flange 20, and the washer 32. Thus, the coil 70 encompasses the copper tube 14 proximate with the first position of the sensing mass 34 therein, and the housing 12 provides an additional flux path for the magnetic flux generated upon energizing the coil 70. A pair of lead wires 72 extends through the housing 12 to facilitate the connection of the coil with a battery 74 via a switch 76, as illustrated schematically in FIG. 1.

The operability of the accelerometer 10 is tested by delivering a unidirectional current pulse through the coil 70. The resulting magnetic field magnetizes the washer 32, which in turn repels the sensing mass 34 to the second position within the passage 24. For example, for the magnetic-pole orientations of the sensing mass illustrated in FIG. 1, the current would be directed through the coil so as to transform the washer into the "south" pole of an electromagnet, whereby the sensing mass would be instantaneously repelled from its first position, or any position between its first position and the second position, to the second position within the passage. Upon reaching the second position, the electrically-conductive surface 62 of the sensing mass bridges the contacts 60, whereby full sensor function is confirmed.

It is significant that, in contrast with known testable accelerometers, the instant invention obviates the need for overriding the nominal magnetic bias on the sensing mass 34 resulting from the magnetic attraction of the sensing mass to the washer 32 since there is only the repelling force upon energizing the coil 70. A significant benefit is the reduced risk of demagnetizing the magnets 36 of the sensing mass when the coil is selectively energized.

The direction of current flow through the coil 70 may be reversed to increase the magnetic force biasing the sensing mass 34 against the stop 30, whereby the accelerometer may be recalibrated to indicate a higher acceleration threshold. For example, where the instant accelerometer 10 is employed as a low-threshold "arming" sensor for a second high-threshold sensor, the threshold of the former may be increased in the event of a failure of the latter, whereby system reliability is substantially improved.

It is noted that the sensor housing 12 and cap 58 are formed of iron or steel in order to isolate the sensing mass 34 from external electromagnetic fields and materials. And, while the housing may magnetically interact with the sensing mass so as to force it into engagement with the passage surface 26, such engagement may nonetheless be preferable to the unpredictable effects on sensor response due to such external magnetic fields and materials. Moreover, the housing may be asymmetrically positioned about the copper tube 14 defining the passage 24 so that the magnetic interaction between the housing and the sensing mass therein tends to counter the force of gravity on the latter, whereby the engagement between the sensing mass and inner surface of the tube due to gravity is also minimized.

While the preferred embodiment of the invention has been disclosed, it should be appreciated that the invention is susceptible of modification without departing from the spirit of the invention or the scope of the subjoined claims.

We claim:

1. An accelerometer comprising
   a housing having a passage extending therein;
   a magnetically-permeable element secured to said housing proximate with the passage;
   a magnetic sensing mass in the passage comprising a pair of permanent magnets and a magnetically-permeable spacer, the magnets being secured to opposite sides of the spacer so as to place a pair of like magnetic poles thereof in opposition, said sensing mass being magnetically biased towards said magnetically-permeable element so as to remain in a first position in the passage until said magnetic bias is overcome by acceleration of said housing, whereupon said sensing mass is displaced in response to such acceleration from said first position towards a second position in the passage, said magnetic bias being sufficient to return said sensing mass to said first position from any other position in the passage short of said second position; and
   switch means operable by said sensing mass when said sensing mass is displaced to said second position.

2. The accelerometer of claim 1 wherein said magnets are secured to said spacer with a fastener.

3. The accelerometer of claim 2 wherein said fastener is formed of a material whose magnetic permeability decreases with increasing temperature.

4. The accelerometer of claim 1 wherein said magnets are secured to said spacer by an enveloping structural element.

5. The accelerometer of claim 4 wherein said enveloping structural element comprises a metalized coating.

6. The accelerometer of claim 4 wherein said enveloping structural element is formed of a material whose magnetic permeability decreases with increasing temperature.

7. The accelerometer of claim 1 including temperature responsive means on said sensing mass for shunting a portion of the magnetic flux generated by said magnets, whereby said magnets are increasingly shunted with decreasing temperature.

8. The accelerometer of claim 1 wherein the magnetic permeability of the spacer increases with increasing temperature.

9. The accelerometer of claim 1 wherein said switch means comprises a pair of electrical contacts engageable with an electrically-conductive surface of said sensing mass upon displacement of said sensing mass to said second position in the passage, whereby said contacts are electrically bridged by the electrically-conductive surface of said sensing mass.

10. The accelerometer of claim 9 wherein the electrically-conductive surface of said sensing mass comprises a portion of a metallic element securing together the magnets and spacer thereof.

11. The accelerometer of claim 9 wherein said contacts move longitudinally of the passage in response to temperature, whereby the distance between said first and second positions is adjusted for temperature.

12. The accelerometer of claim 11 wherein said contacts move longitudinally of the passage towards said first position therein with decreasing temperature.

13. The accelerometer of claim 1 including magnetic damping means for retarding the displacement of said sensing mass in the passage.

14. The accelerometer of claim 13 wherein said magnetic damping means comprises an electrically-conductive non-magnetic ring encompassing the passage, the displacement of said sensing mass in the passage, inducing an electric current flowing substantially circumferentially in said ring, said electric current in said ring generating a magnetic field opposing such displacement of said sensing mass.

15. The accelerometer of claim 1 including switchable means for reversibly magnetizing said magnetically-permeable element.

16. The accelerometer of claim 15 wherein said switchable means for reversibly magnetizing said magnetically-permeable element comprises an electrical coil proximate with said magnetically-permeable element and switchable means for delivering a direct current through said coil.

17. An accelerometer comprising
a tube;
a magnetically-permeable element proximate with said tube;
a magnetic sensing mass in said tube
comprising a pair of permanent magnets and a magnetically-permeable spacer, the magnets being secured to opposite sides of the spacer so as to place a pair of like magnetic poles in opposition, said sensing mass being magnetically biased towards said magnetically-permeable element so as to remain in a first position in said tube until said magnetic bias is overcome by acceleration of said tube, whereupon said sensing mass is displaced in response to such acceleration from said first position towards a second position in said tube, said magnetic bias being sufficient to return said sensing mass to said first position from any other position in said tube short of said second position; and
switch means operable by said sensing mass when said sensing mass is displaced to said second position.

18. The accelerometer of claim 17 wherein said tube is formed of an electrically-conductive nonmagnetic material.

19. The accelerometer of claim 18 wherein the magnetic permeability of the spacer of said sensing mass increases with increasing temperature.

20. The accelerometer of claim 18 including an electrical coil proximate with said magnetically-permeable element and switchable means for delivering a direct current through said coil, whereby said magnetically-permeable element is magnetized upon such delivery of said current to said coil.

21. The accelerometer of claim 17 including temperature-responsive means for adjusting the distance between said first and second positions in said tube.

22. The accelerometer of claim 21 wherein said temperature-responsive means for adjusting the distance between said first and second positions comprises means for moving said switch means longitudinally of said tube.

* * * * *